(12) United States Patent
Braiman

(10) Patent No.: US 8,615,265 B2
(45) Date of Patent: Dec. 24, 2013

(54) CODED SYSTEM FOR RADIO FREQUENCY COMMUNICATION

(75) Inventor: Michael Braiman, Netanya (IL)

(73) Assignee: Precyse Technologies, Inc., Atlanta, GA (US)

(*) Notice: Subject to any disclaimer, the term of this patent is extended or adjusted under 35 U.S.C. 154(b) by 366 days.

(21) Appl. No.: 13/059,278

(22) PCT Filed: Aug. 14, 2009

(86) PCT No.: PCT/IB2009/006792
§ 371 (c)(1),
(2), (4) Date: May 2, 2011

(87) PCT Pub. No.: WO2010/020880
PCT Pub. Date: Feb. 25, 2010

(65) Prior Publication Data
US 2011/0207497 A1 Aug. 25, 2011

(30) Foreign Application Priority Data
Aug. 17, 2008 (IL) .......................................... 193504

(51) Int. Cl.
*H04B 7/00* (2006.01)
(52) U.S. Cl.
USPC .............. 455/517; 713/178; 380/44; 375/141
(58) Field of Classification Search
USPC ....................................................... 455/517
See application file for complete search history.

(56) References Cited

U.S. PATENT DOCUMENTS

| | | | |
|---|---|---|---|
| 5,073,931 A * | 12/1991 | Audebert et al. ............. | 380/251 |
| 5,410,292 A * | 4/1995 | Le Van Suu ................... | 370/479 |
| 5,497,411 A * | 3/1996 | Pellerin ......................... | 455/411 |
| 5,946,343 A * | 8/1999 | Schotz et al. ................. | 375/141 |
| 5,953,368 A * | 9/1999 | Sanderford et al. .......... | 375/141 |
| 5,987,058 A * | 11/1999 | Sanderford et al. .......... | 375/141 |
| 6,243,369 B1 * | 6/2001 | Grimwood et al. ........... | 370/335 |
| 6,357,007 B1 * | 3/2002 | Cromer et al. ................ | 713/194 |
| 6,393,566 B1 * | 5/2002 | Levine .......................... | 713/178 |
| 6,847,624 B2 * | 1/2005 | Ishii et al. ..................... | 370/335 |
| 7,002,899 B2 * | 2/2006 | Azenkot et al. ............... | 370/208 |
| 7,058,814 B1 * | 6/2006 | Zimmerman .................. | 713/178 |
| 7,222,360 B1 * | 5/2007 | Miller ................................ | 726/3 |
| 7,313,164 B1 * | 12/2007 | Wilson et al. ................. | 375/141 |
| 7,333,612 B2 * | 2/2008 | Maino et al. .................. | 380/256 |
| 7,400,695 B2 * | 7/2008 | Murdin et al. ................ | 375/354 |

(Continued)

OTHER PUBLICATIONS

Piramuthu, S., "Protocols for RFID tag/reader authentication", Decision Support Systems, 2007, 43(3):897-914.

(Continued)

*Primary Examiner* — Hai V Nguyen
(74) *Attorney, Agent, or Firm* — Duane Morris LLP

(57) ABSTRACT

A coded system for radio-frequency communication (RFC); the system comprising at least one base station (20) and a plurality of mobile devices (10); the base station and mobile devices are individually provided with running time information synchronized inter se; the mobile device is adapted for transmitting an identifying signal to the base station device; the base station is adapted for receiving the signal; wherein the signal further comprises a preamble including a miming-time-dependent code generated according to a predetermined algorithm (220); the base station is adapted for comparing the code with a reference code generated by the base station according to the algorithm (260), authorizing the RFC in response to coincidence of the running-time-dependent codes generated by the base station and the mobile (270).

22 Claims, 5 Drawing Sheets

(56) References Cited

U.S. PATENT DOCUMENTS

| | | | |
|---|---|---|---|
| 7,525,374 B2* | 4/2009 | Robert et al. | 329/311 |
| 7,633,994 B2* | 12/2009 | Forenza et al. | 375/141 |
| 7,636,381 B2* | 12/2009 | Forenza et al. | 375/141 |
| 7,706,823 B2* | 4/2010 | Buda et al. | 455/502 |
| 7,738,889 B2* | 6/2010 | Nakada | 455/506 |
| 7,805,612 B2* | 9/2010 | Alrabady | 713/178 |
| 8,005,065 B2* | 8/2011 | Jia et al. | 370/350 |
| 8,069,350 B2* | 11/2011 | Nowottnick | 713/168 |
| 8,116,255 B2* | 2/2012 | Rigal et al. | 370/321 |
| 8,160,121 B2* | 4/2012 | Forenza et al. | 375/141 |
| 8,185,886 B2* | 5/2012 | Rothman et al. | 717/173 |
| 8,405,924 B2* | 3/2013 | Annampedu | 360/51 |
| 2005/0207579 A1* | 9/2005 | Maino et al. | 380/256 |
| 2006/0023583 A1* | 2/2006 | Annampedu et al. | 369/47.1 |
| 2006/0101287 A1* | 5/2006 | Morten | 713/193 |
| 2006/0143481 A1* | 6/2006 | Morten | 713/193 |
| 2006/0274166 A1* | 12/2006 | Lee et al. | 348/231.99 |
| 2007/0109121 A1* | 5/2007 | Cohen | 340/539.26 |
| 2007/0130469 A1* | 6/2007 | Alrabady | 713/178 |
| 2007/0150965 A1* | 6/2007 | Redlich et al. | 726/27 |
| 2007/0192838 A1* | 8/2007 | Laitinen et al. | 726/4 |
| 2008/0045149 A1* | 2/2008 | Dharmaraju et al. | 455/39 |
| 2008/0095367 A1* | 4/2008 | Maino et al. | 380/256 |
| 2008/0177994 A1* | 7/2008 | Mayer | 713/2 |
| 2008/0194296 A1* | 8/2008 | Roundtree | 455/558 |
| 2008/0246656 A1* | 10/2008 | Ghazarian | 342/357.07 |
| 2010/0208894 A1* | 8/2010 | True et al. | 380/270 |
| 2011/0200189 A1* | 8/2011 | True et al. | 380/44 |
| 2012/0149338 A1* | 6/2012 | Roundtree | 455/411 |

OTHER PUBLICATIONS

ISR/Written Opinion issued Jun. 11, 2010 in PCT/IB09/006792.

* cited by examiner

CODED SYSTEM FOR RADIO FREQUENCY COMMUNICATION

FIELD OF THE INVENTION

The present invention relates to a system for radio-frequency communication (RFC) used in Asset Visibility and Control (AVC) applications, and, more specifically, to a system for RFC using coded dependent on predetermined variables.

BACKGROUND OF THE INVENTION

The RFC used in Asset Visibility and Control enables a user to remotely control assets of interest. For instant, radio-frequency identification (RFID), Real Time Locating System (RTLS), machine-to-machine (M2M), smart agent networks can be referred.

RFID is an automatic identification method, relying on storing and remotely retrieving data using devices called RFID mobile devices or transponders. A RFID mobile device is an object that can be applied to or incorporated into a product, animal or person for the purpose of identification using radio waves. Some mobile devices can be read from several meters away and beyond the line of sight of the reader.

Most RFID mobile devices contain at least two parts. One is an integrated circuit for storing and processing information, modulating and demodulating a RF-signal, and other specialized functions. The second part is an antenna for receiving and transmitting the signal.

RTLS is used to track and identify the location of objects in real time using simple, inexpensive nodes (badges/mobile devices) attached to or embedded in objects and devices (readers) that receive the wireless signals from these mobile devices to determine their locations. RTLS typically refers to systems that provide passive (automatic) collection of location information.

M2M refers to data communications between machines. The key pieces of a typical M2M system include: (a) a device or group of devices capable of replying to requests for data contained within those devices or capable of transmitting data contained within those devices autonomously; (b) a communications link to connect the device or group of devices to a computer server or another device; (c) a software agent, process, or interface by which the data can be analyzed, reported, and/or acted upon; (d) software intelligence.

Most often, M2M systems are task-specific. It means that an M2M system is purpose-built for just one specific device, or a very restricted class of devices in an industry. This is one of the indicators of the M2M market still being in its infancy, as a unified intercommunication standard has yet to evolve.

A replay attack is a form of network attack in which a valid data transmission is maliciously or fraudulently repeated or delayed. This is carried out either by the originator or by an adversary who intercepts the data and retransmits it, possibly as part of a masquerade attack by IP packet substitution (such as stream cipher attack).

A breach of security in which information is stored without authorization and then retransmitted to trick the receiver into unauthorized operations such as false identification or authentication or a duplicate transaction. For example, messages from an authorized user who is logging onto a network may be captured by an attacker and resent (replayed) the next day. Even though the messages may be encrypted, and the attacker may not know what the actual keys and passwords are, the retransmission of valid logon messages is sufficient to gain access to the network.

An attacker can also generate (mimic) a data transition gaining a fraudulent access. A signal (or a sequence thereof) of predetermined carrier frequency, amplitude and frequency modulations can be mimicked.

Also known as a "man-in-the-middle attack," a replay attack can be prevented using strong digital signatures that include time stamps and inclusion of unique information from the previous transaction such as the value of a constantly incremented sequence number.

A timestamp is a sequence of characters, denoting the date and/or time at which a certain event occurred. This data is usually presented in a consistent format, allowing for easy comparison of two different records and tracking progress over time; the practice of recording timestamps in a consistent manner along with the actual data is called timestamping.

Timestamps are typically used for logging events, in which case each event in a log is marked with a timestamp. In file-systems, timestamp may mean the stored date/time of creation or modification of a file.

US Application 2007030469 ('469) discloses a system and method for providing secure oneway transmissions in a vehicle wireless communications system. The system and method rely on a clock signal to assure that the vehicle and server receive proper messages. The vehicle and the server will periodically synchronize their internal clocks to a global clock signal. The server will add its local time to the body of a message including a vehicle identification number and a function code. According to '469, the server will then encrypt the message and transmit it to the vehicle. The vehicle will decrypt the message and compare the transmitted vehicle identification number with its identification number. If the identification numbers match, the vehicle will then see if the time in the message is within a predefined window of the vehicle time. If the transmitted time is within the predefined window of the vehicle time, the vehicle will accept the message and perform the function.

As said above, the unauthorized person is able to breach security and to gain an access to information by means of replaying or mimicking to trick the receiver into unauthorized operations such as false identification or authentication or a duplicate transaction. Providing measures preventing the unauthorized persons from breaching RFC security is hence an unmet long-felt need.

SUMMARY OF THE INVENTION

It is hence one object of the invention to disclose a coded system for RFC for Asset Visibility and Control; the system comprises at least one base station and a plurality of mobile devices. The base station and mobile devices are individually provided with running time information synchronized inter se. The mobile device is adapted for transmitting an identifying signal to the base station device. The base station is adapted for receiving the signal.

It is a core purpose of the invention to provide the signal further comprising a preamble including a running-time-dependent code generated according to a predetermined algorithm. The base station is adapted for comparing the code with a reference code generated by the base station according to the predetermined algorithm, authorizing the RFC in response to coincidence of the running-time-dependent codes generated by the base station and the mobile device.

Another object of the invention is to disclose a coded system for RFC. The system comprises at least one base station and a plurality of mobile devices. The mobile device is adapted for transmitting an identifying signal to the base station device. The base station is adapted for receiving the signal.

It is a core purpose of the invention to provide the base station and mobile devices with records of preceding communications. The signal further comprises a preamble including a code dependent on a number of communications generated according to a predetermined algorithm. The base station is adapted for comparing the code with a reference code generated by the base station according to the predetermined algorithm, authorizing the RFC in response to coincidence of the number-dependent codes generated by the base station and the mobile device.

A further object of the invention is to disclose the base station further adapted for transmitting an interrogating signal to the mobile device. The mobile device is adapted for receiving the interrogating signal from the base station and for transmitting the identifying signal to the base station in response to the interrogating signal.

A further object of the invention is to disclose the mobile device further comprising a clock, means for generating running-time-dependent code, and a transceiver adapted for receiving the interrogating signal and transmitting the identifying signal in response to the interrogating signal.

A further object of the invention is to disclose the mobile device further comprising a clock, means for generating number-dependent code, and a transceiver adapted for receiving the interrogating signal and transmitting the identifying signal in response to the interrogating signal.

A further object of the invention is to disclose the base station further comprising a clock, a control unit, and a transceiver. The control unit is adapted for interrogating the mobile, generating a reference running-time-dependent code, identifying the mobile device in response to coincidence of the running-time-dependent codes generated in the mobile device and base station. The transceiver is adapted for transmitting an interrogating signal to the mobile device and receiving the identifying signal from the mobile device.

A further object of the invention is to disclose the base station further comprising a control unit, and a transceiver; the control unit is adapted for interrogating the mobile, generating a reference number-dependent code, identifying the mobile device in response to coincidence of the number-dependent codes generated in the mobile device and the base station. The transceiver is adapted for transmitting an interrogating signal to the mobile device and receiving the identifying signal from the mobile device.

A further object of the invention is to disclose the base station and mobile devices individually comprising clock means synchronized inter se.

A further object of the invention is to disclose the base station comprising clock means. The base station is adapted for transmitting running time information to the mobile device.

A further object of the invention is to disclose the running time information provided to the base station from external clock means.

A further object of the invention is to disclose the running time information is provided to the base station from Global Positioning System.

A further object of the invention is to disclose an embodiment wherein the running time information is individually provided to the base station and mobile device from Global Positioning System.

A further object of the invention is to disclose a method of RFC using code communication. The method comprises the steps of: (a) providing a base station and a mobile device; (b) obtaining the running time information by the mobile device; (c) generating a running-time-dependent code according to a predetermined algorithm by the mobile device; (d) transmitting an identifying signal by the mobile device; the signal comprises a preamble including the running-time-dependent code and mobile data; (e) receiving the identifying signal by the base station; (f) generating a reference running-time-dependent code according to the predetermined algorithm by the base station; (g) comparing the running-time-dependent codes generated by the mobile device the the base station; (h) authorizing the RFC in response to coincidence of the running-time-dependent code generated by the mobile device with the reference running-time-dependent code generated by the base station and (i) processing data provided by the mobile device.

A further object of the invention is to disclose a method of RFC using code communication. The method comprises the steps of: (a) providing a base station and a mobile device accommodating records of preceding communications; (b) generating a number-dependent code according to a predetermined algorithm by the mobile device; (c) transmitting an identifying signal by the mobile device; the signal comprises a preamble including the number-dependent code and mobile ID data; (d) receiving the identifying signal by the base station; (e) generating a reference number-dependent code according to the predetermined algorithm by the base station; (f) comparing the number-dependent codes generated by the mobile device and the base station; (g) authorizing the RFC in response to coincidence of the number-dependent code generated by the mobile device with the reference number-dependent code generated by the base station and (h) processing data provided by the mobile device.

A further object of the invention is to disclose the method further comprising the step of transmitting an interrogating signal by the base station and receiving the signal by the mobile device. The steps of generating the running-time-dependent code and transmitting the identifying signal by the mobile device are performed in response to receiving the interrogating signal.

A further object of the invention is to disclose the method further comprising the step of transmitting an interrogating signal by the base station and receiving the signal by the mobile device. The steps of generating the number-dependent code and transmitting the identifying signal by the mobile device are performed in response to the receiving the interrogating signal.

A further object of the invention is to disclose the running time information provided by clock means synchronized inter se. The clock means are individually embedded in the base station and the mobile device.

A further object of the invention is to disclose the running time information provided by clock means embedded in the base station. The running time information provided by the base station clock means is transmitted to the mobile device.

A further object of the invention is to disclose the running time information provided to the base station from external clock means.

A further object of the invention is to disclose the running time information provided to the base station from Global Positioning System.

A further object of the invention is to disclose the running time information individually provided to the base station and mobile device from Global Positioning System.

BRIEF DESCRIPTION OF THE DRAWINGS

In order to understand the invention and to see how it may be implemented in practice, a plurality of embodiments is adapted to now be described, by way of non-limiting example only, with reference to the accompanying drawing, in which.

DETAILED DESCRIPTION OF THE INVENTION

Figure 1:
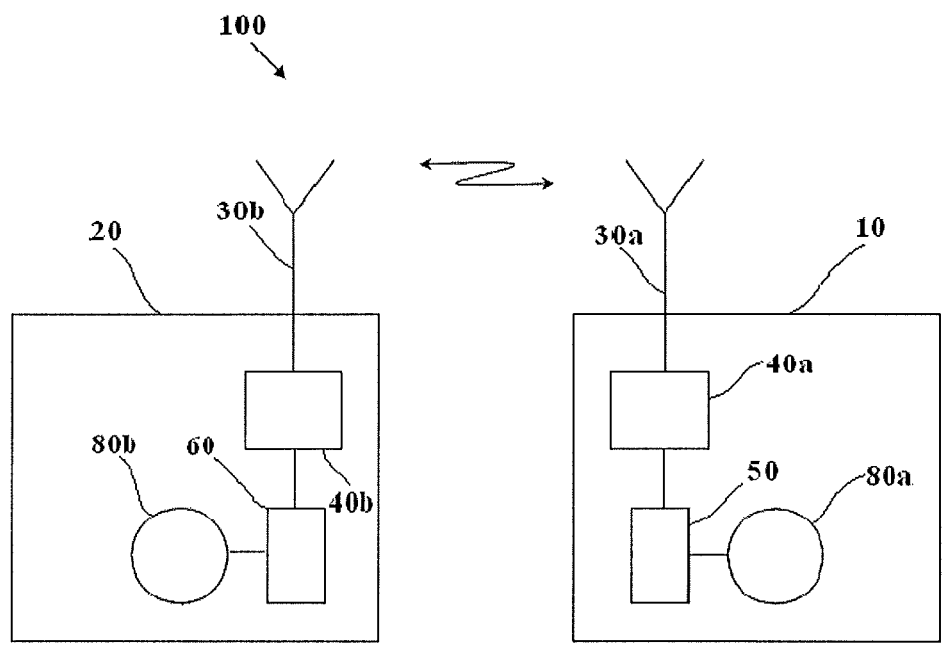
FIG. 1 is a schematic view of the coded RFC system.

The following description is provided, alongside all chapters of the present invention, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a coded system for RFC.

The term Asset Visibility and Control (AVC) hereinafter refers to an ability to identify, trace, provide telemetry and control over assets of interest The term 'Smart Agent' hereinafter refers to a mobile device attached to the asset of interest supporting RFC and providing AVC functionalities The term 'Radio-Frequency Access' for the purpose of the current application hereinafter refers to authorizing a wireless access of mobile device to remotely perform any operation such as entering into a close area, controlling materials and supplies inventories, or performing bank transactions.

The term 'Radio Frequency Identification (RFID)' hereinafter refers to an automatic identification method, relying on storing and remotely retrieving data using devices called RFID mobile devices or transponders.

The term 'Replay Attack' hereinafter refers to a form of network attack in which a valid data transmission is maliciously or fraudulently repeated or delayed.

The term 'transceiver' hereinafter refers to a device that has both a transmitter and a receiver which are combined and share common circuitry or a single housing.

The term 'encryption' hereinafter refers to a process of transforming information (referred to as plaintext) using an algorithm (called cipher) to make it unreadable to anyone except those possessing special knowledge, usually referred to as a key. The result of the process is encrypted information (in cryptography, referred to as cipher-text). In many contexts, the word encryption also implicitly refers to the reverse process, decryption (e.g. "software for encryption" can typically also perform decryption), to make the encrypted information readable again (i.e. to make it unencrypted).

The term 'provided time information' for the purpose of the current application hereinafter refers to running time readings performed using any clock means (embedded clock means, time synchronizing by GPS signals or other). Time information is individually provided to the reader and mobile device devices.

The term 'running-time-dependent code' for the purpose of the current application hereinafter refers to a signal (or a sequence thereof) corresponding to running time according to a predetermined function.

The term 'parametric code' for the purpose of the current application hereinafter refers to a signal (or a sequence thereof) corresponding to a parameter according to a predetermined function.

The term 'number-dependent code' for the purpose of the current application hereinafter refers to a signal (or a sequence thereof) corresponding to a number of referencing to the base station according to a predetermined function.

Reference is now made to FIG. 1, showing the time-coded system for RFC 100. Exemplarily, the system 100 comprises a base station 20 and a mobile device 10. Any quantity of devices 10 and 20 is in the scope of the current invention. The base station 20 is designed for identifying the mobile device 10.

The mobile device comprises a clock 80a; coding unit 50 adapted for generating a running-time-dependent code according to a predetermined algorithm; a transceiver 40a provided with an antenna 30a and adapted for transmitting an identifying signal further comprising among other data an unique mobile device ID. A preamble of the identifying signal includes the aforesaid running-time-dependent code and mobile devicedata.

The base station 20 comprises a clock 80b; a control unit 60, adapted for generating reference running-time-dependent code according to the predetermined algorithm, comparing the aforesaid reference code with the code provided by the mobile device 10, a transceiver 40b adapted for receiving an identifying signal transmitted by the mobile device 10. The transceiver 40b is provided with an antenna 30b.

In accordance with another embodiment of the current invention, the base station transceiver 40b and is adapted for transmitting an interrogating signal to the mobile device 10 while the transceiver 40a of the mobile device 10 transmits the coded identifying signal in response to receiving the interrogating signal.

Figure 2:
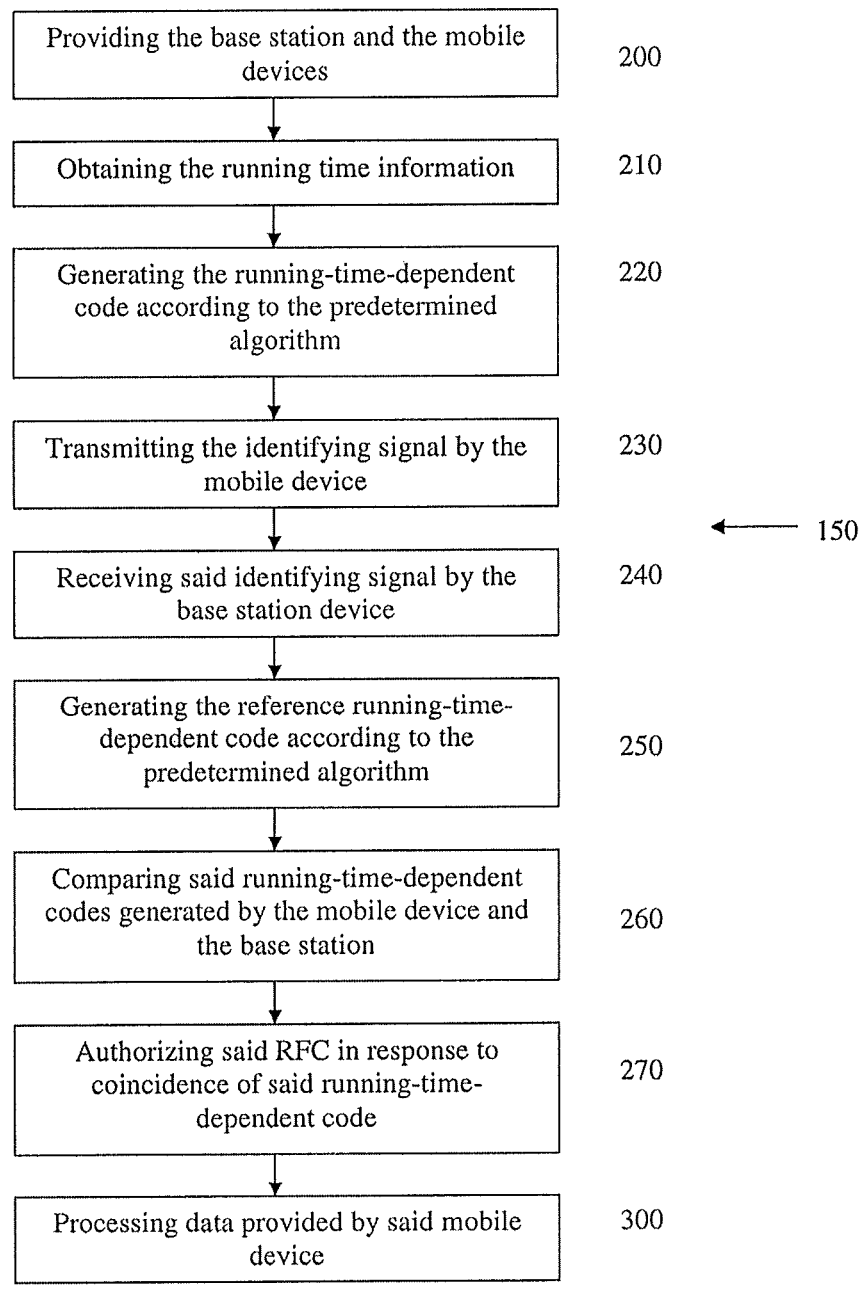
FIG. 2 is a flowchart of the method of the RFC using running-time-dependent coding.

Reference now is made to FIG. 2, presenting a method of RFC 150 using time coding. The method 150 comprises a number of steps 200-300. The method 150 constitutes an interaction of the base station and the mobile device provided at step 200. The running time information obtained at the step 210 is coded according to a predetermined algorithm at step 220. The identifying signal comprising a running-time-dependent code in the preamble thereof is transmitted by the mobile device transceiver at step 230. The base station receives the aforesaid signal at step 240. After a reference running-time-dependent code according to the predetermined algorithm is generated at step 250, the received running-time-dependent code is compared with the reference code provided to the generated by the base station at step 260. Authorizing the RFC in response to coincidence of the running-time-dependent code is performed at step 270. Coincidence of the running-time-dependent codes provided to the base station and the mobile device and is a condition of authorizing RFC of the mobile device device by the reader device. The successful authorizing of the RFC is followed by processing the data provided by the mobile device (step 300)

Figure 3:
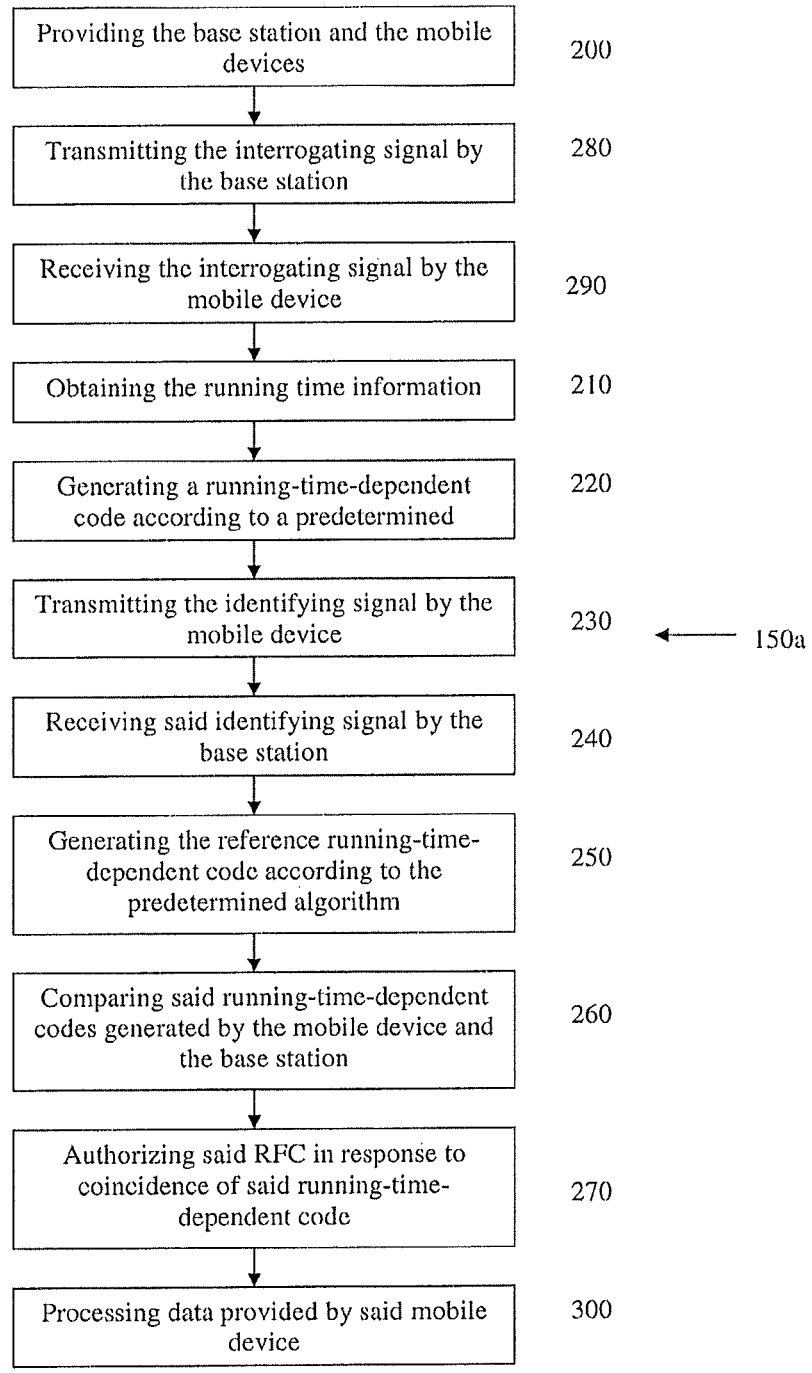
FIG. 3 is a flowchart of the running-time-dependent coding method of RFC activated by the interrogated signal.

Reference is now made to FIG. 3, presenting a method of RFID 150a. The base station transmits the interrogating signal to the mobile device at step 280. The mobile device receives the aforesaid interrogating signal at step 290. Then, the further step 210 is activated in response to an arrival of the interrogating signal. The further procedure is identical to the method 150.

Thus, in accordance with the current invention, the encrypted running time information is a key providing a dynamic protection from tampering by means of transmitting information maliciously or fraudulently repeated, delayed or mimicked. The dynamically changing key excludes security breaches due to forgery of data.

Figure 4:
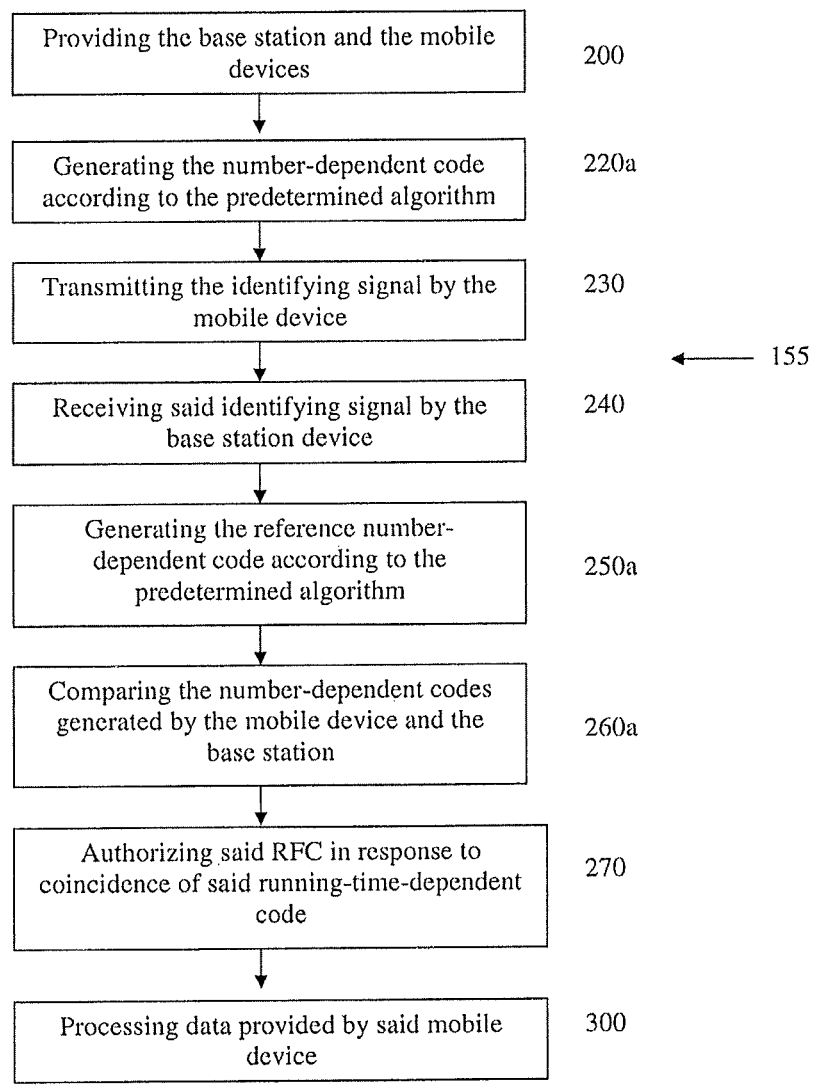
FIG. 4 is a flowchart of the method of RFC using number-dependent coding.
Figure 5:
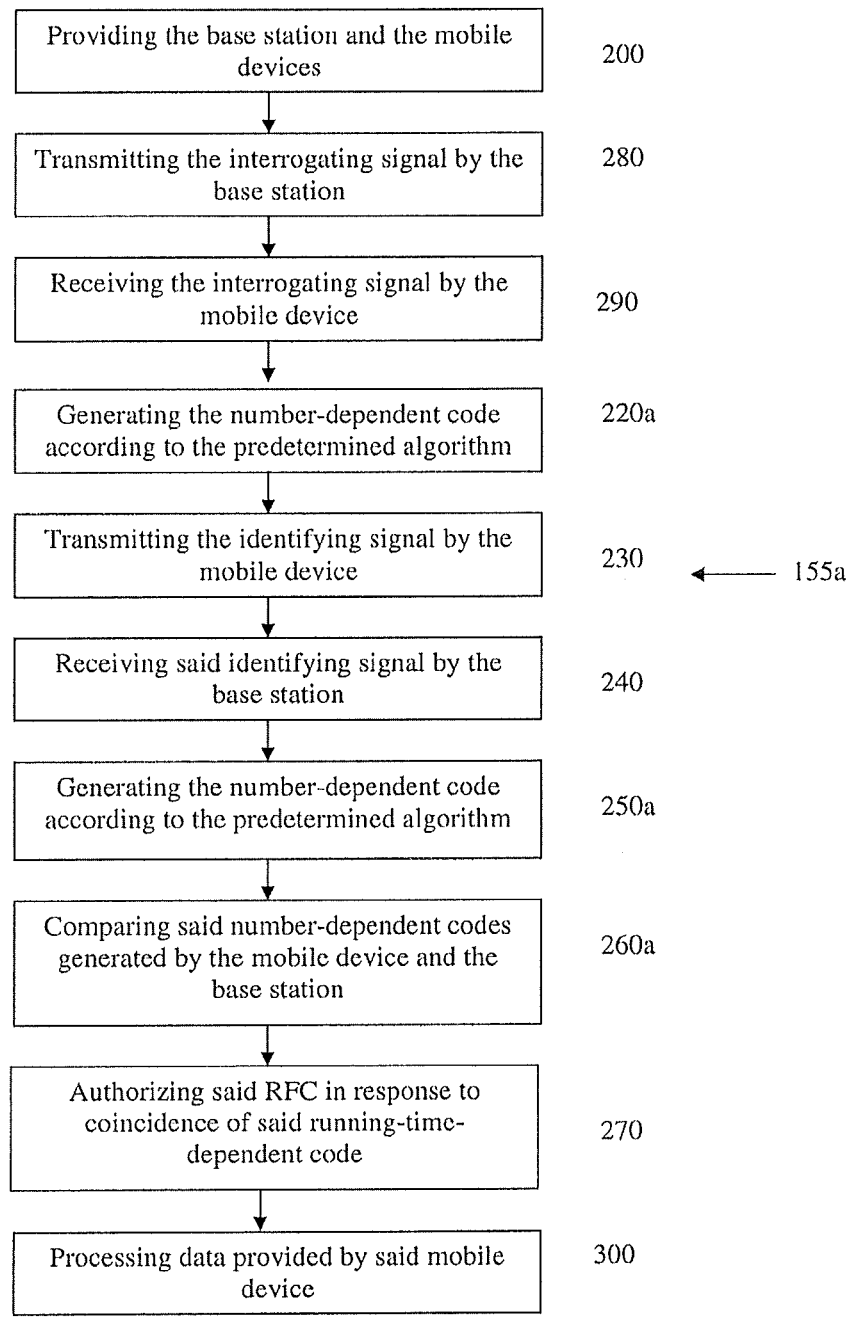
FIG. 5 is a flowchart of the number-dependent coding method of RFC activated by the interrogated signal.

Reference is now made to FIGS. 4 and 5, presenting methods of RFC 155 and 155a using a parametric code. The base station and the mobile device are provided with records of communications. Analogously to the methods 150 and 150a, the steps 220a, 250a, and 260a comprise generating a coded signal depending on a number of communications the mobile device to the base station (a number-dependent code) in the mobile device, generating a reference number-dependent code in the base station, and comparing both codes, respectively. As said above, in contrast to methods 150 and 150a, the methods presented in FIGS. 4 and 5 use the referencing number as a parameter providing dynamic protection from tampering.

In accordance with the current invention, the time-coded system for RFC is disclosed. The time-coded system comprises at least one base station and a plurality of mobile devices wirelessly connected inter se. The base station and mobile devices are individually provided with running time information synchronized inter se. The mobile device is adapted for transmitting an identifying to the base station device. The base station is adapted for receiving the identifying signal.

The aforesaid signal further comprises a preamble including a running-time-dependent code generated according to a predetermined algorithm. The base station is adapted for comparing the code with reference a reference code generated by the base station according to the algorithm, authorizing the RFC in response to coincidence the running-time-dependent codes generated by the base station and the mobile device.

In accordance with another embodiment of the current invention, a number-coded system for RFC is disclosed. The number-coded system comprising at least one base station and a plurality of mobile devices wirelessly connected inter se. The mobile device is adapted for transmitting an identifying signal to the base station device. The base station is adapted for receiving the signal.

The base station and mobile devices are provided with records of preceding communications. The signal further comprises a preamble including a code dependent on a number of communication generated according to a predetermined algorithm. The base station is adapted for comparing the code with reference a reference code generated by the base station according to the predetermined algorithm, authorizing the RFC in response coincidence the number-dependent codes generated by the base station and mobile.

In accordance with a further embodiment of the current invention, the base station is further adapted for transmitting an interrogating signal to the mobile device. The mobile device is adapted for receiving the interrogating signal from the base station and for transmitting the identifying signal to the base station in response to the interrogating signal.

In accordance with a further embodiment of the current invention, the mobile device further comprises a clock, means for generating running-time-dependent code, and a transceiver adapted for receiving the interrogating signal and transmitting the identifying signal in response to the interrogating signal.

In accordance with a further embodiment of the current invention, the mobile device further comprises a clock, means for generating number-dependent code, and a transceiver adapted for receiving the interrogating signal and transmitting the identifying signal in response to the interrogating signal.

In accordance with a further embodiment of the current invention, the base station further comprises a clock, a control unit, and a transceiver; the control unit is adapted for interrogating the mobile, generating a reference running-time-dependent code, identifying the mobile device in response to coincidence of the running-time-dependent codes generated in the mobile device and base station. The transceiver is adapted for transmitting an interrogating signal to the mobile device and receiving the identifying signal from the mobile device.

In accordance with a further embodiment of the current invention, the base station further comprises a control unit, and a transceiver. The control unit is adapted for interrogating the mobile, generating a reference number-dependent code, identifying the mobile device in response to coincidence of the number-dependent codes generated in the mobile device and base station. The transceiver is adapted for transmitting an interrogating signal to the mobile device and receiving the identifying signal from the mobile device.

In accordance with a further embodiment of the current invention, the base station and the mobile devices individually comprise clock means synchronized inter se.

In accordance with a further embodiment of the current invention, the base station comprises clock means; the base station is adapted for transmitting running time information to the mobile device.

In accordance with a further embodiment of the current invention, running time information is provided to the base station from any external clock means.

In accordance with a further embodiment of the current invention, running time information is provided to the base station from Global Positioning System.

In accordance with a further embodiment of the current invention, running time information is individually provided to the base station and the mobile device from Global Positioning System.

In accordance with a further embodiment of the current invention, a method of RFC using time-coded communication is disclosed. The method time-coded comprises the steps of (a) providing a base station and a mobile device; (b) obtaining the running time information by the mobile device; (c) generating a running-time-dependent code according to a predetermined algorithm by the mobile device; (d) transmitting an identifying signal by the mobile device; the signal comprises a preamble including the running-time-dependent code; (e) receiving the identifying signal by the base station; generating a reference running-time-dependent code according to the predetermined algorithm by the base station; (f) comparing the running-time-dependent codes generated by the mobile device and the base station; (g) authorizing the RFC in response to coincidence of the running-time-dependent code generated by the mobile device with the reference running-time-dependent code generated by the base station; and (h) processing data provided by the mobile device.

In accordance with a further embodiment of the current invention, a method of RFC using parameter-coded communication is disclosed. The method comprises the steps of (a) providing a base station and a mobile device accommodating records of preceding communications; (b) generating a number-dependent code according to a predetermined algorithm by the mobile device; (c) transmitting an identifying signal by the mobile device; the identifying signal comprises a preamble including the number-dependent code and mobile data; (d) receiving the identifying signal by the base station; (e) generating a reference number-dependent code according to the predetermined algorithm by the base station; (f) comparing the number-dependent codes generated by the mobile device and the base station; (g) authorizing the RFC in response to coincidence of the number-dependent code generated by the mobile device with the reference number-dependent code generated by the base station; and (h) processing data provided by the mobile device.

In accordance with a further embodiment of the current invention, the method further comprises the step of transmitting an interrogating signal by the base station and receiving the signal by the mobile device. The steps of generating the running-time-dependent code and transmitting the identifying signal by the mobile device are performed in response to the receiving the interrogating signal.

In accordance with a further embodiment of the current invention, the method further comprises the step of transmitting an interrogating signal by the base station and receiving the signal by the mobile device. The steps of generating the number-dependent code and transmitting the identifying signal by the mobile device are performed in response to the receiving the interrogating signal.

Thus, in accordance with the current invention, the running time information and number of communication between the mobile device and the base station are alternative keys providing a dynamic protection from tampering by means of transmitting information maliciously or fraudulently repeated, delayed, or mimicked. The dynamically changing key excludes security breaches due to forgery of data.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A coded system for radio-frequency access for Asset Visibility and Control;
   said system comprising at least one base station and a plurality of mobile devices wirelessly connected inter se;
   said base station and mobile devices are individually provided with running time information synchronized inter se;
   said mobile device is adapted for transmitting an identifying signal to said base station device;
   said base station is adapted for receiving said signal;
   wherein said signal further comprises a preamble including a running time dependent code generated according to a predetermined algorithm;
   said base station is adapted for comparing said code with a reference code generated by said base station according to said algorithm, authorizing said RFC in response to coincidence said running time dependent codes generated by said base station and said mobile device.

2. The coded system for RFC according to claim 1, wherein said base station is further adapted for transmitting an interrogating signal to said mobile device; said mobile device is adapted for receiving said interrogating signal from said base station and for transmitting said identifying signal to said base station in response to said interrogating signal.

3. The coded system for RFC according to claim 1, wherein said mobile device further comprises a clock, means for generating running time dependent code, and a transceiver adapted for receiving said interrogating signal and transmitting said identifying signal in response to said interrogating signal.

4. The coded system for RFC according to claim 1, wherein said base station further comprises a clock, a control unit, and a transceiver; said control unit is adapted for interrogating said mobile, generating a reference running time dependent code, identifying said mobile device in response to coincidence of said running time dependent codes generated in said mobile device and base station and recognizing said mobile data; said transceiver is adapted for transmitting an interrogating signal to said mobile device and receiving said data from said mobile device.

5. The coded system for RFC according to claim 1, wherein said base station and mobile devices individually comprise clock means synchronized inter se.

6. The coded system for RFC according to claim 1, wherein said base station comprises clock means; said base station is adapted for transmitting running time information to said mobile device.

7. The coded system for RFC according to claim 6, wherein said running time information is provided to said base station from external clock means.

8. The coded system for RFC according to claim 1, wherein said running time information is provided to said base station from Global Positioning System.

9. The coded system for RFC according to claim 1, wherein said running time information is individually provided to said base station and mobile device from Global Positioning System.

10. A coded system for RFC;
    said system comprising at least one base station and a plurality of mobile devices wirelessly connected inter se;
    said mobile device is adapted for transmitting an identifying signal to said base station device
    said base station is adapted for receiving said signal;
    wherein said base station and mobile devices are provided with records of preceding communications;
    said signal further comprises a preamble including a code dependent on a number of communication generated according to a predetermined algorithm;
    said base station is adapted for comparing said code with a reference code generated by said base station according to said predetermined algorithm, authorizing said RFC in response to coincidence said number dependent codes generated by said base station and said mobile.

11. The coded system for RFC according to claim 10, wherein said mobile device further comprises a clock, means for generating number dependent code, and a transceiver adapted for receiving said interrogating signal and transmitting said identifying signal in response to said interrogating signal.

12. The coded system for RFC according to claim 10, wherein said base station further comprises a control unit, and a transceiver; said control unit is adapted for interrogating said mobile, generating a reference number dependent code, identifying said mobile device in response to coincidence of said number dependent codes generated in said mobile device and base station and recognizing said mobile data; said transceiver is adapted for transmitting an interrogating signal to said mobile device and receiving said identifying signal from said mobile device.

13. The coded system for RFC according to claim 10, wherein said base station is further adapted for transmitting an interrogating signal to said mobile device; said mobile device is adapted for receiving said interrogating signal from said base station and for transmitting said identifying signal to said base station in response to said interrogating signal.

14. A method of RFC using code communication; said method comprising the steps of
    (a) providing a base station and a mobile device;
    (b) obtaining said running time information by said mobile device;
    (c) generating a running time dependent code according to a predetermined algorithm by said mobile device;

(d) transmitting an identifying signal by said mobile device; said signal comprises a preamble including said running time dependent code;
(e) receiving said identifying signal by said base station;
(f) generating a reference running time dependent code according to said predetermined algorithm by said base station;
(g) comparing said running time dependent codes generated by said mobile device and said base station;
(h) authorizing said RFC in response to coincidence of said running time dependent code generated by said mobile device with said reference running time dependent code generated by said base station; and
(i) processing data provided by said mobile device.

15. The method of RFC according to claim 14, wherein said method further comprises the step of transmitting an interrogating signal by said base station and receiving said signal by said mobile device; the steps of generating said running time dependent code and transmitting said identifying signal by said mobile device are performed in response to said receiving said interrogating signal.

16. The method of RFC according to claim 14, wherein said running time information is provided by clock means synchronized inter se; said clock means are individually embedded in said base station and said mobile device.

17. The method of RFC according to claim 14, wherein said running time information is provided by clock means embedded in said base station; said running time information provided by said base station clock means is transmitted to said mobile device.

18. The method of RFC according to claim 14, wherein said running time information is provided to said base station from Global Positioning System.

19. The method of RFC according to claim 14, wherein said running time information is individually provided to said base station and mobile device from Global Positioning System.

20. A method of RFC using code communication; said method comprising the steps of
   (a) providing a base station and a mobile device accommodating records of preceding communications;
   (b) generating a number dependent code according to a predetermined algorithm by said mobile device;
   (c) transmitting an identifying signal by said mobile device; said signal comprises a preamble including said number dependent code;
   (d) receiving said identifying signal by said base station;
   (e) generating a reference number dependent code according to said predetermined algorithm by said base station;
   (f) comparing said number dependent codes generated by said mobile device and said base station;
   (g) authorizing said RFC in response to coincidence of said number dependent code generated by said mobile device with said reference number dependent code generated by said base station; and
   (h) processing data provided by said mobile device.

21. The method of RFC according to claim 20, wherein said method further comprises the step of transmitting an interrogating signal by said base station and receiving said signal by said mobile device; the steps of generating said number dependent code and transmitting said identifying signal by said mobile device are performed in response to said receiving said interrogating signal.

22. The method of RFC according to claim 21, wherein said running time information is provided to said base station from external clock means.

* * * * *

UNITED STATES PATENT AND TRADEMARK OFFICE
CERTIFICATE OF CORRECTION

PATENT NO. : 8,615,265 B2
APPLICATION NO. : 13/059278
DATED : December 24, 2013
INVENTOR(S) : Michael Braiman Page 1 of 1

It is certified that error appears in the above-identified patent and that said Letters Patent is hereby corrected as shown below:

In the Claims:

Claim 1, Column 9, Line 30 – delete "radio-frequency access" and insert -- radio-frequency access (RFC) --.

Claim 3, Column 9, Line 57 – delete "code," and insert -- code --.

Claim 10, Column 10, Line 32 – delete "communication" and insert -- communications --.

Signed and Sealed this
Twenty-third Day of June, 2015

Michelle K. Lee
*Director of the United States Patent and Trademark Office*